(12) United States Patent
Averitt et al.

(10) Patent No.: US 7,479,748 B2
(45) Date of Patent: Jan. 20, 2009

(54) SYSTEMS AND METHODS OF TRACKING PARTITION SYSTEM PERFORMANCE

(75) Inventors: Scott Averitt, Roseville, MI (US); Mark Wilson, Pinckney, MI (US)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 11/586,244

(22) Filed: Oct. 25, 2006

(65) Prior Publication Data

US 2008/0100247 A1    May 1, 2008

(51) Int. Cl.
*H02K 17/32* (2006.01)
(52) U.S. Cl. .................. 318/434; 318/433; 318/432
(58) Field of Classification Search .......... 318/434, 318/432, 433, 466, 445, 443, 444, 449, 453, 318/458, 561, 465, 468, 469
See application file for complete search history.

(56) References Cited

U.S. PATENT DOCUMENTS

| | | | |
|---|---|---|---|
| 5,044,222 A | 9/1991 | Tanaka et al. | |
| 5,076,016 A | 12/1991 | Adams et al. | |
| 5,404,673 A | 4/1995 | Takeda et al. | |
| 5,749,173 A | 5/1998 | Ishida et al. | |
| 5,755,059 A | 5/1998 | Schap | |
| 5,833,301 A | 11/1998 | Watanabe et al. | |
| 5,990,646 A | 11/1999 | Kovach et al. | |
| 5,994,858 A | 11/1999 | Miura | |
| 6,108,976 A | 8/2000 | Kato et al. | |
| 6,198,242 B1 | 3/2001 | Yokomori et al. | |
| 6,799,669 B2 | 10/2004 | Fukumura et al. | |
| 6,864,654 B1 * | 3/2005 | Letor et al. | 318/434 |
| 6,925,757 B2 | 8/2005 | Priest et al. | |
| 2002/0157313 A1 | 10/2002 | Fukazawa et al. | |
| 2003/0007851 A1 | 1/2003 | Heigel et al. | |
| 2003/0051555 A1 | 3/2003 | Fukumura et al. | |
| 2004/0065017 A1 | 4/2004 | Priest et al. | |
| 2004/0138843 A1 | 7/2004 | Bouamra et al. | |
| 2005/0039405 A1 | 2/2005 | Yokomori | |

OTHER PUBLICATIONS

European Search Report for European Patent Application No. EP07020902 dated Jan. 11, 2008.

* cited by examiner

*Primary Examiner*—Karen Masih
(74) *Attorney, Agent, or Firm*—Michael Best & Friedrich LLP

(57) ABSTRACT

A method of monitoring the operation of a partition movement system having a partition. In an embodiment, the method includes monitoring a parameter having a relation to movement of the partition, generating a first value based on the monitored parameter, and generating a difference value between the first value and a threshold value. The threshold value is indicative of a potential pinch condition. The method also includes determining a position value of the partition corresponding to a relative position of the partition when the difference value is generated, and using at least one of the difference value and the position value to determine a state of the partition movement system.

28 Claims, 2 Drawing Sheets

SYSTEMS AND METHODS OF TRACKING PARTITION SYSTEM PERFORMANCE

FIELD

The invention relates to systems and methods of monitoring the operation and performance of a powered partition, particularly a powered partition of a vehicle.

BACKGROUND

Many vehicles include movable partitions (e.g., a window, a sunroof, a sliding door, power tail gate, power lift gate, etc.) that are displaced using a partition drive system. For example, a window in a door of a vehicle may be moved up and down using a direct-current ("DC") permanent magnet electric motor. Generally, a user continually actuates a control button (e.g., an "up" control button) to initialize the drive system and move the partition. However, some partition drive systems are equipped with an "automatic open" or "automatic close" function, where a user can fully open or fully close the partition with a single, momentary actuation of a control button.

In order to effectively move partitions, drive systems need to produce a significant amount of force. As a result, partition drive systems can produce forces that pose potential hazards. Thus, a variety of techniques can be implemented in an attempt to mitigate the potential hazards.

SUMMARY

In one embodiment, a partition movement system for a vehicle having a partition includes an anti-pinch processing module, a diagnostic module, and a memory module. The anti-pinch processing module monitors movement of the partition and generates an anti-pinch signal having a value that is indicative of a potential pinch condition when it exceeds a threshold. The diagnostic module generates a difference signal between the anti-pinch signal value and the threshold, and generates a position signal that corresponds to a relative position of the partition when the difference signal is generated. The memory module stores the difference signal and the corresponding position signal.

In another embodiment, a method of monitoring the operation of a partition movement system having a partition includes monitoring a parameter having a relation to movement of the partition, generating a first value based on the monitored parameter, and generating a difference value between the first value and a threshold value. The threshold value is indicative of a potential pinch condition. The method also includes determining a position value of the partition corresponding to a relative position of the partition when the difference value is generated, and using at least one of the difference value and the position value to determine a state of the partition movement system.

In yet another embodiment, a method of monitoring the operation of a partition movement system having a partition includes moving the partition from a first position to a second position and monitoring a parameter while the partition is in motion. The parameter has a relation to movement of the partition and also has a threshold value. The method also includes generating a difference value between the parameter of the partition and the threshold value and determining a relative position of the partition when the difference value is generated. The method also includes using the relative position and the difference value to determine a state of the partition movement system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1:
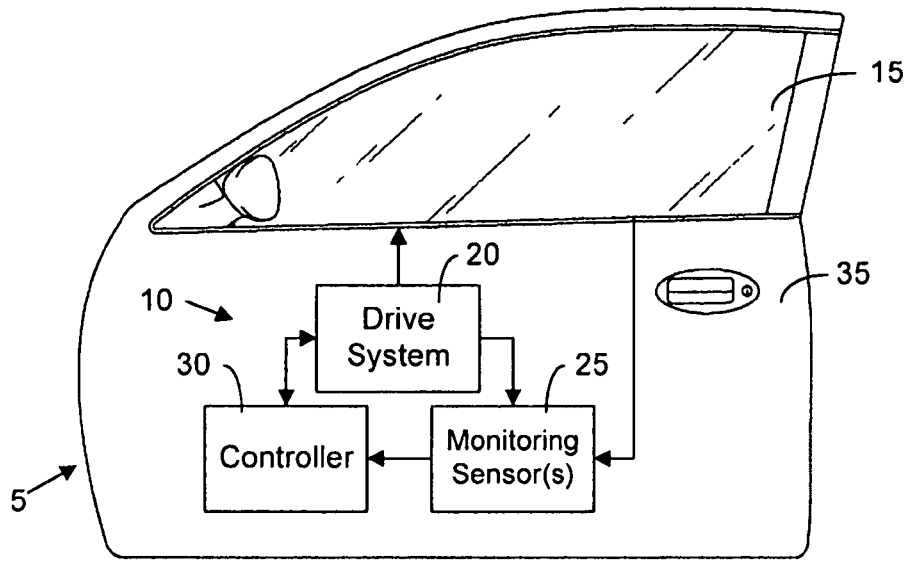
FIG. 1 is a partial side view of a portion of a vehicle with an exemplary embodiment of a partition movement system shown as a block diagram.

FIG. 1 illustrates a portion of a vehicle 5 having an exemplary partition movement system 10. The system 10 generally includes a movable partition 15, a partition drive system 20, one or more monitoring sensors 25, and a controller 30. The drive system 20 is used to move the partition 15, while the one or more monitoring sensors 25 are generally used to monitor one or more parameters of the partition 15 (e.g., speed, direction of travel, acceleration, etc.) and/or one or more parameters of the drive system 20 (e.g., drive current, input voltage, temperature, etc.).

In the embodiment shown in FIG. 1, the partition 15 is a window that is movable within a vehicle door 35. However, most generally, the partition 15 can take the form of a variety of partitions such as a sunroof, a sliding door, a trunk hatch, a tail gate, and the like that are movable via a drive system. Other non-vehicle related movable partitions 15 include slidable room partitions or garage doors, for example. The drive system 20 includes components that are used to move the partition 15. In one embodiment, the drive system 20 includes a permanent magnet DC motor, a plurality of pulleys and/or gears, and a cable. In other embodiments, the drive system 20 can include a different type of motor, or other mechanical components to aid in moving the partition 15.

The monitoring sensors 25 are used to gather information regarding one or more parameters of the partition movement system 10, and can include a variety of sensors and/or other devices to do so. For example, speed sensors, proximity sensors, pressure transducers, switches, and the like can be coupled to, or positioned near, the partition 15 to measure the speed, direction of travel, acceleration, and force being exerted on the partition 15. Other monitoring sensors 25 can monitor parameters of the partition 15 indirectly through another system, such as the drive system 20. For example, other monitoring sensors 25 measure parameters of a motor included in the drive system 20, such as a voltmeter measuring motor voltage, an ammeter measuring drive current, a temperature sensor measuring motor temperature, etc. The data gathered by the sensors can be processed by a controller, as discussed below, to provide information regarding the state of the partition 15.

In one embodiment, the controller 30 is a stand-alone processing unit that is in communication with both the drive system 20 and the monitoring sensors 25. In another embodiment, the controller 30 may comprise circuitry that is integrated directly into components of the drive system 20, the monitoring sensors 25, or a combination thereof. Additionally, the controller 30 can be positioned proximate to the partition 15 (e.g., in the door 35), or in a location remote from the partition 15 (e.g., in an engine compartment). The controller 30, among other things, transmits data to, and receives data from, the drive system 20, and receives data from the monitoring sensors 25. As a result, the controller 30 can control motion of the partition 15 using the drive system 20 (e.g., a motor of the drive system 20), while tracking the speed, position, direction of travel, and/or acceleration of the partition 15 using the monitoring sensors 25.

In some embodiments, the controller 30 uses data from the monitoring sensors 25 to mitigate potentially hazardous conditions associated with the drive system 20. For example, the controller 30 stops the operation of a motor of the drive system 20 to reduce a potentially hazardous condition, such as a pinch condition (i.e., a condition in which an object is being "pinched" or trapped between the partition 15 and another stationary object). The controller 30 may also reverse the direction of the motor of the drive system 20 to mitigate the pinch condition. Known algorithms or other methods, for example, the methods described in U.S. Pat. No. 6,456,027, assigned to Robert Bosch GmbH, the entire contents of which are incorporated herein by reference, can be used to indicate the presence of an object in the path of the partition 15. The controller 30 can also be used to detect and/or predict a false stop or false reversal condition. For example, the controller 30 can aid in determining whether a pinch condition exists, or if other forces are causing the algorithms or other methods to report a false pinch condition, as discussed below.

Figure 2:
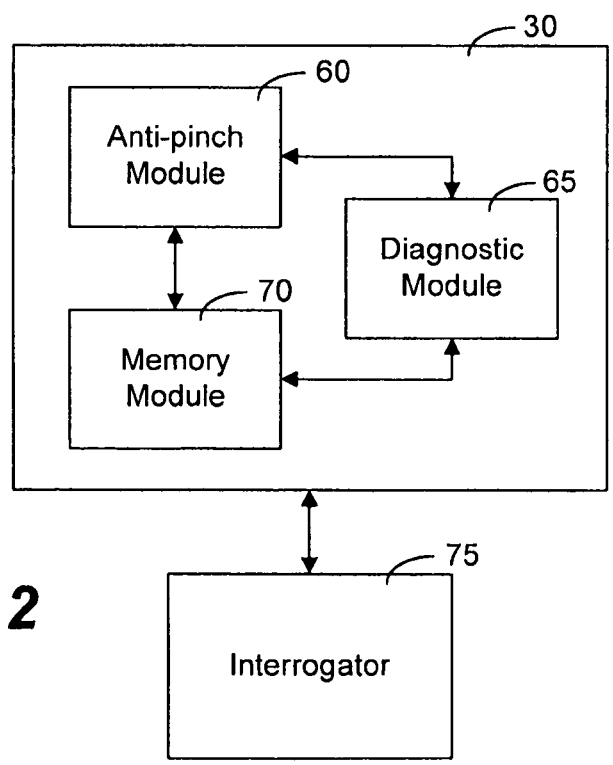
FIG. 2 is a block diagram of an exemplary controller used in the partition movement system.

FIG. 2 illustrates the exemplary controller 30 of FIG. 1 in greater detail. In the embodiment shown in FIG. 2, the controller 30 includes an anti-pinch module 60, a diagnostic module 65, and a memory module 70. In other embodiments, the controller 30 may include a variety of other processing and/or memory modules, as should be apparent to one of ordinary skill in the art.

The anti-pinch module 60 contains an algorithm or another known method (as previously discussed) that can be used to indicate the presence of an object in the path of the partition 15, thereby also indicating a potential pinch condition. For example, in some embodiments, the anti-pinch module 60 generates one or more numerical values that represent the state of the partition 15. The value that is generated by the anti-pinch module 60 can be based upon, for example, parameters measured by the monitoring sensors 25 including, but not limited to, the speed, acceleration, and/or position or the partition 15 while the partition 15 is in motion. This anti-pinch value is then compared with one or more threshold values to indicate the presence of an object in the path of the partition 15. The threshold value is determined to be an amount or percentage from a normal operating value (e.g., a value generated by the anti-pinch module 60 under normal operating conditions). As such, if the value generated by the anti-pinch module 60 traverses the threshold value when the comparison is completed, a potential pinch condition is identified. The anti-pinch algorithm can be evaluated from the point at which the partition 15 begins to move to the point at which the partition 15 stops moving (e.g., the seal at the top of the door 35).

In some embodiments, the algorithm that the anti-pinch module 60 uses to indicate the presence of an object in the path of the partition 15 is complex (e.g., the algorithm includes multiple parameters such as speed, acceleration, etc.). Additionally, the drive system 20 used to move the partition 15 can be complex (e.g., including multiple gears, pulleys, motors, etc.), which can lead to the development of speed slowdowns or other malfunctions that are not caused by an object in the path of the partition 15. For example, speed slowdowns can be caused by a variety of circumstances including but not limited to gear deformation, improper assembly, wear, physical damage to system components, etc. The complexity of the algorithms as well as the complexity of the drive system 20 can cause the anti-pinch module 60 to falsely identify a pinch condition, thereby causing the drive system 20 to stop or reverse the direction of the partition. Such false stops or false reversals can be frustrating to a user.

The diagnostic module 65 provides additional processing of the values generated by the anti-pinch module 60. This additional processing can be used as a diagnostic tool to indicate and/or predict a false stop or a false reversal condition. In some embodiments, the diagnostic module 65 compares the values generated by the anti-pinch module 60 to the threshold values. The magnitude of that comparison, or margin value, can then be used to indicate and/or predict a false stop or a false reversal condition. For example, a relatively small margin value indicates that the value generated by the anti-pinch module 60 is approaching the threshold (i.e., the point at which the anti-pinch module stops or reverses the direction of the partition 15). Accordingly, the margin value can be used as a diagnostic tool to indicate whether the partition 15 is moving smoothly, or if a force is acting on the partition 15 and causing a decreased margin value.

In some embodiments, the diagnostic module 65 generates a series or string of margin values that spans the entire travel distance of the partition 15. Alternatively, the diagnostic module 65 may only generate margin values for predetermined phases of partition travel (e.g., during initial partition movement, during normal running conditions, just before closing, etc.). Additionally, the diagnostic module 65 correlates the generated margin values to the relative position of the partition 15, such that each generated margin value includes a corresponding relative position value. The relative position of the partition 15 can be attained from, for example, a sensor included in the monitoring sensors 25. If a margin value indicates questionable or sub-standard partition system performance, the corresponding position value can provide the location that the questionable or sub-standard performance occurred. In other embodiments, the diagnostic module 65 can also monitor, correlate, and/or otherwise utilize a variety of other data related to the speed, acceleration, direction of travel, etc. of the partition in addition to the margin values and position values.

The memory module 70 includes a memory device that can be used to store the margin values and corresponding position values that are generated by the diagnostic module 65. For example, in one embodiment, the memory module 70 includes a random access memory ("RAM"). In other embodiments, a variety of suitable memory devices can be implemented in the memory module 70, as should be apparent to one skilled in the art. The memory module 70 can also receive data from the anti-pinch module 60, the drive system 20, or the monitoring sensors 25, and store other data including, but not limited to, the speed, acceleration, or direction of travel of the partition.

An interrogator 75 is also shown in FIG. 2. The interrogator 75 is a device that can access data from the controller 30. For example, the interrogator 75 can interface with the controller 30 to gain access to data stored in the memory module 70. In one embodiment, the interrogator 75 is a handheld diagnostic tool that links directly to the controller 30 and accesses and/or uploads the data stored in the memory module 70. In another embodiment, the interrogator 75 is device that wirelessly links to the controller 30 and accesses and/or uploads the data stored in the memory module 70 from a remote location (e.g., a satellite, a communications tower, etc.).

Figure 3:
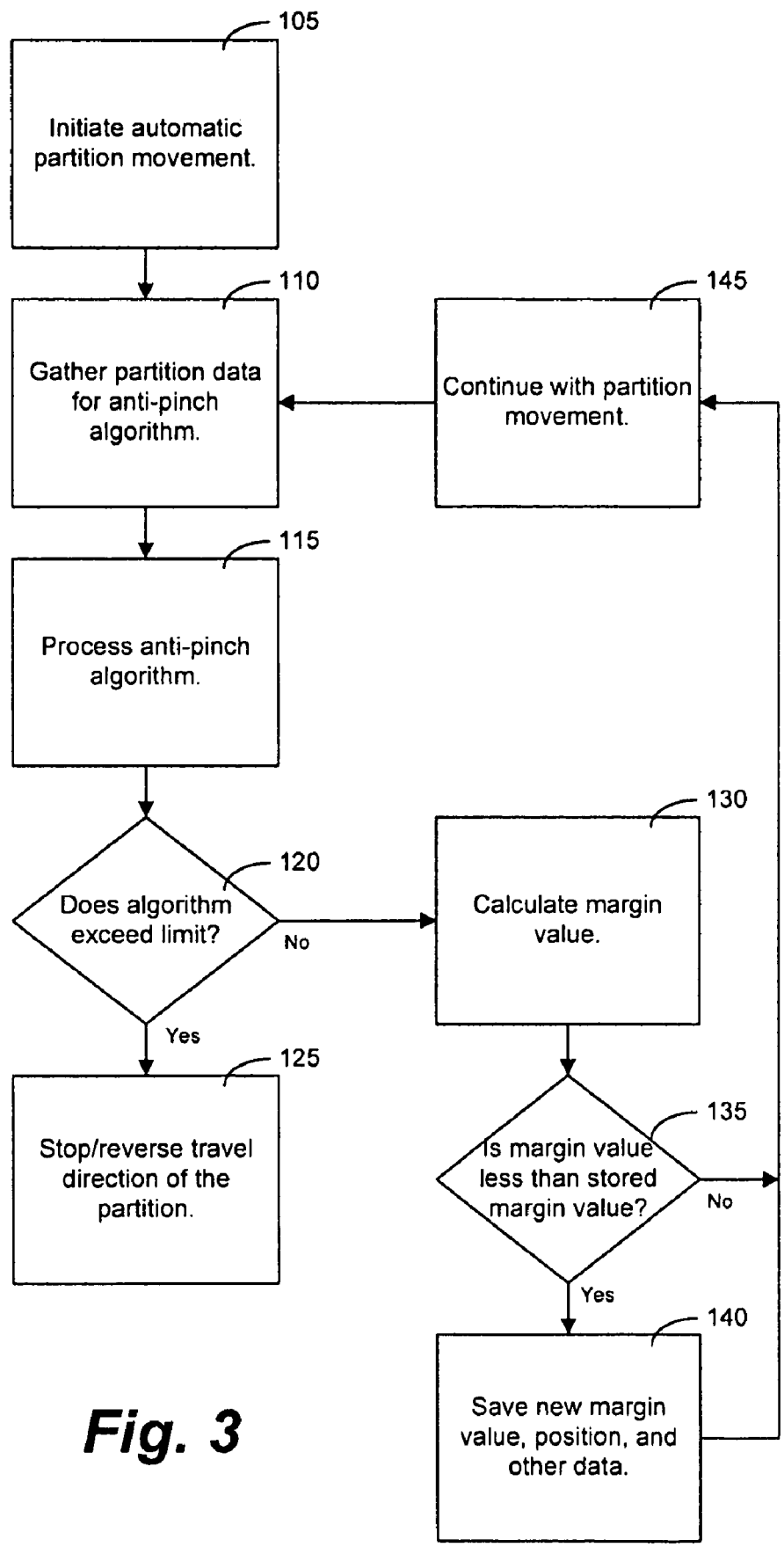
FIG. 3 is a flow chart of a process that can be used to detect a false partition reversal.

FIG. 3 illustrates a process 100 that can be used to monitor and/or track the performance of the partition movement system 10. In some embodiments, the process 100 is carried out or evaluated by the controller 30, shown in FIGS. 1 and 2. The process 100 may be evaluated on a continual basis such that the process 100 is evaluated multiple times while the partition 15 is in motion. The first step in the process is to initiate movement of the partition 15 (step 105). In some embodiments, an automatic partition movement is initiated, such as a "one touch close" feature. The next step in the process 100 is to gather data related to the state or movement of the partition (step 110). For example, data can be gathered by the one or more monitoring sensors 25 to indicate the speed, acceleration, relative position, direction of travel, and the like of the partition 15, as described with respect to FIGS. 1 and 2. After gathering the required data, the data is processed, for example, by an anti-pinch algorithm (step 115). The processing yields a result that is representative of the state of the partition, which is then compared to a threshold or limit (step 120), as described with respect to the anti-pinch module 60 and diagnostic module 65, respectively, of FIG. 2. If the result of the comparison evaluated in step 120 traverses the predetermined limit, a pinch condition is identified and the partition is stopped and/or its direction is reversed (step 125).

If the result of the comparison evaluated in step 120 does not traverse the predetermined limit, a margin value is calculated (step 130). As previously described, the margin value is the difference between the value generated by the anti-pinch algorithm and a corresponding threshold value. If the process 100 is not being completed for the first time (e.g., the partition 15 is in motion and the process 100 has already been evaluated at least once), the margin value is compared to the margin value that was calculated the last time the process 100 was completed (step 135). If the current margin value is less than the previous margin value, the margin value, the corresponding position value, and any other data is stored (step 140). The data can be stored, for example, in the memory module 70. The partition 15 then continues to move (step 145) and the process 100 is evaluated again. If the margin value is greater than the previous margin value, movement is continued (step 145) and the process 100 is repeated, but the margin value is not stored. In this way, the margin value and corresponding position value is only stored for the point at which the partition 15 was the closest to exceeding the anti-pinch threshold and initiating a partition stop or reversal during a partition closure. However, in some embodiments, several margin values and corresponding position values are stored for a single partition closure. For example, the partition travel may be divided into several phases (e.g., initial start-up phase, normal run phase, and sealing region phase), and a margin value and corresponding position value can be stored for each of the phases, as discussed in greater detail below.

One exemplary implementation of the process 100 is described below. As should be apparent to one of ordinary skill in the art, the implementation described below is set forth as an example only, and the process 100 is capable of being applied and carried out in a variety of ways. The process 100 is initiated each time an automatic closure feature is activated. Three different regions are monitored, including a motor startup phase, a normal run phase, and a seal phase. The motor startup phase represents the portion of partition travel that begins when a motor of the drive system 20 is first activated and ends after the anti-pinch algorithm included in the anti-pinch module (FIG. 2) has determined that the motor speed has stabilized. The normal run phase represents the portion of partition travel that begins at the end of the motor startup phase and ends at a point that the anti-pinch algorithm expects to contact the seal of the partition 15. The seal phase represents the portion of partition travel that begins after the end of the normal run phase and ends when the partition 15 reaches the position where the anti-pinch feature is turned off (i.e., the anti-pinch algorithm is not computed). The controller 30 stores a minimum margin value in each of the phases, as well as a corresponding position value for each of the minimum margin values, in the memory module 70. The minimum margin values and corresponding position values are then retrieved from the memory module 70 via a diagnostic request message that is sent to the controller 30 over a controller area network ("CAN") communication bus. The diagnostic request message may be sent by, for example, the interrogator 75. The following hexadecimal message structure provides an exemplary communication between the interrogator 75 and the controller 30:

| Interrogator: | Rx | 8 | 03 3B FA 49 FF FF FF FF | Diagnostic request |
|---|---|---|---|---|
| Controller: | Tx | 8 | 10 0F 7B FA 49 qq qq rr | 1st Diagnostic response |
| Controller: | Tx | 8 | 21 rr ss ss tt tt uu uu | 2nd Diagnostic response |
| Controller: | Tx | 8 | 22 vv vv FF FF FF FF FF | 3rd Diagnostic response | where "qq qq" is the minimum margin value of the seal phase; "rr rr" is the position value of the seal phase where the minimum margin value was found; "ss ss" is the minimum margin value of the normal run phase; "tt tt" is the position value of the normal run phase where the minimum margin value was found; "uu uu" is the minimum margin value of the motor startup phase; and "vv vv" is the position value of the motor startup phase where the minimum margin value was found. In one embodiment, after the last diagnostic response message is sent, the controller 30 is programmed to reset and clear the stored values in the memory module 70. The process 100 can then be run again during the next auto closure activation.

In another embodiment, the controller 30 records the number of times a minimum margin value was found within a certain range of each of the phases described above. This frequency information can be used to set a diagnostic code or simply to keep a history of partition system performance.

Various features of the invention are set forth in the following claims.

What is claimed is:

1. A method of monitoring the operation of a partition movement system, the method comprising:
 establishing a stored position value that identifies a relative position of a partition most likely to trigger a false indication of a potential pinch condition;
 establishing a stored difference value associated with the stored position value;
 monitoring a parameter having a relation to movement of the partition;
 generating a first value based on the monitored parameter;
 generating a difference value between the first value and a threshold value, the threshold value indicative of a potential pinch condition;
 determining a position value of the partition corresponding to a relative position of the partition when the difference value is generated;
 comparing the difference value to the stored difference value;
 replacing the stored difference value with the difference value if the difference value is less than the stored difference value; and
 replacing the stored position value with the position value if the difference value is less than the stored difference value.

2. The method of claim 1, wherein monitoring a parameter includes monitoring at least one of a speed, a direction of travel, and a relative position of the partition.

3. The method of claim 1, further comprising moving the partition with a motor, and wherein monitoring a parameter includes monitoring at least one of a drive current, a voltage, and a temperature of the motor.

4. The method of claim 1, further comprising storing the difference value and the position value in a memory.

5. The method of claim 4, further comprising interrogating the memory to access the stored difference value.

6. The method of claim 5, wherein interrogating the memory includes accessing the memory via a wired connection.

7. The method of claim 5, wherein interrogating the memory includes accessing the memory via a wireless connection.

8. The method of claim 1, further comprising storing the monitored parameter in a memory.

9. The method of claim 1, further comprising moving the partition from a first point to a second point and generating multiple first values, multiple difference values, and multiple position values as the partition moves from the first point to the second point.

10. The method of claim 1, further comprising defining a startup zone, a run zone, and a seal zone; and generating a plurality of difference values for each zone.

11. The method of claim 10, further comprising storing the smallest difference value and a corresponding position value for the startup zone, the smallest difference value and a corresponding position value for the run zone, and the smallest difference value and a corresponding position value for the seal zone.

12. A method of monitoring the operation of a partition movement system, the method comprising:
 establishing a stored position value that identifies a relative position of a partition most likely to trigger a false indication of a potential pinch condition;
 establishing a stored difference value associated with the stored position value;
 moving the partition from a first position to a second position;
 monitoring a parameter while the partition is in motion, the parameter having a relation to movement of the partition and having a threshold value;
 generating a difference value between the parameter of the partition and the threshold value;
 determining a relative position of the partition when the difference value is generated;
 comparing the difference value to the stored difference value;
 replacing the stored difference value with the difference value if the difference value is less than the stored difference value; and
 replacing the stored position value with the position value if the difference value is less than the stored difference value.

13. The method of claim 12, further comprising transmitting the stored position value of the partition movement system to a diagnostic device.

14. The method of claim 12, further comprising executing an anti-pinch algorithm using the monitored parameter.

15. The method of claim 12, wherein monitoring a parameter includes monitoring a speed of the partition, a direction of travel of the partition, a position of the partition, a force exerted on the partition, or a combination thereof.

16. The method of claim 12, wherein moving the partition from a first position to a second position includes moving the partition with a motor, and wherein monitoring a parameter includes monitoring at least one of a drive current, a voltage, and a temperature of the motor.

17. The method of claim 12, further comprising storing the monitored parameter and transmitting the stored monitored parameter to a diagnostic device.

18. The method of claim 12, further comprising defining two or more movement zones and assigning a first threshold value to the parameter for a first movement zone, and assigning a second threshold value to the parameter for a second movement zone.

19. The method of claim 18, further comprising generating a difference value for the first movement zone and a difference value for the second movement zone, determining a relative position for the first movement zone and a relative position for the second movement zone, and storing the relative position for the first movement zone, the relative position for the second movement zone, the difference value for the first movement zone, and the difference value for the second movement zone.

20. The method of claim 12, further comprising generating an array of difference values and determining an array of relative positions.

21. The method of claim 20, further comprising comparing a difference value in the array of difference values to a preceding difference value, and storing a lowest difference value in the array of difference values with a relative position of the lowest difference value.

22. A partition movement system for a vehicle, the partition movement system comprising:
 an anti-pinch processing module configured to monitor movement of a partition and generate a plurality of anti-pinch signals at a corresponding plurality of relative positions of the partition, a diagnostic module configured to generate a difference signal between each anti-pinch signal and the threshold, and to generate a position signal corresponding to the relative position of the partition when the difference signal is generated; and a memory module configured to store a difference value indicative of the smallest difference signal and a position value indicative of the corresponding position signal.

23. The partition movement system of claim 22, wherein the anti-pinch signal is generated using an anti-pinch algorithm, the anti-pinch algorithm including a speed of partition parameter, a direction of partition travel parameter, a position of partition parameter, or a combination thereof.

24. The partition movement system of claim 22, wherein the partition movement system includes a motor and the anti-pinch signal is generated using an anti-pinch algorithm, the anti-pinch algorithm including a motor drive current parameter, a motor voltage parameter, a motor temperature parameter, or a combination thereof.

25. The partition movement system of claim 22, wherein the anti-pinch processing module, diagnostic module, and memory module are common to a single controller.

26. The partition movement system of claim 22, further comprising an interrogator configured to access the stored difference value and the stored position value in the memory module.

27. The partition movement system of claim 22, wherein the partition is configured to move from a first position to a second position and the diagnostic module is configured to generate a plurality of difference signals while the partition moves from the first position to the second position.

28. The partition movement system of claim 27, wherein the diagnostic module compares the plurality of difference signals, and the memory module stores the lowest difference value.

* * * * *